(12) United States Patent
Nangare

(10) Patent No.: US 10,147,450 B2
(45) Date of Patent: Dec. 4, 2018

(54) METHOD AND APPARATUS FOR DETERMINING READ-HEAD DEVIATION USING ORTHOGONAL PREAMBLES

(71) Applicant: Marvell World Trade Ltd., St. Michael (BB)

(72) Inventor: Nitin Nangare, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/861,249

(22) Filed: Jan. 3, 2018

(65) Prior Publication Data

US 2018/0122413 A1   May 3, 2018

Related U.S. Application Data

(63) Continuation of application No. 15/215,052, filed on Jul. 20, 2016, now Pat. No. 9,875,762, which is a continuation of application No. 14/797,393, filed on Jul. 13, 2015, now Pat. No. 9,424,880.

(60) Provisional application No. 62/024,251, filed on Jul. 14, 2014.

(51) Int. Cl.
| | |
|---|---|
| *G11B 5/596* | (2006.01) |
| *G11B 20/10* | (2006.01) |
| *G11B 20/12* | (2006.01) |
| *G11B 20/14* | (2006.01) |

(52) U.S. Cl.
CPC ...... *G11B 5/59627* (2013.01); *G11B 5/59688* (2013.01); *G11B 20/10009* (2013.01); *G11B 20/10046* (2013.01); *G11B 20/1217* (2013.01); *G11B 20/1403* (2013.01); *G11B 2020/1229* (2013.01)

(58) Field of Classification Search
None
See application file for complete search history.

(56) References Cited

U.S. PATENT DOCUMENTS

| | | | |
|---|---|---|---|
| 5,381,281 A | 1/1995 | Shrinkle et al. | |
| 5,966,264 A | 10/1999 | Belser et al. | |
| 7,193,800 B2 | 3/2007 | Coker et al. | |
| 7,342,734 B1 | 3/2008 | Patapoutian et al. | |
| 7,440,224 B2 | 10/2008 | Ehrlich et al. | |
| 7,751,144 B1 * | 7/2010 | Sutardja | G11B 5/59688 360/77.07 |
| 7,916,415 B1 | 3/2011 | Chue | |

(Continued)

*Primary Examiner* — K. Wong

(57) ABSTRACT

A storage device includes read circuitry having a read head having a detector that outputs signals representing data from a first track and an adjacent track. The read head is subject to off-track excursions during which the read head detects signals from both the first track and an adjacent track. Data on each track includes a preamble including a repeating pattern. The repeating pattern in any first track is orthogonal to the repeating pattern in any track adjacent to the first track. The read circuitry also includes respective Discrete Fourier Transform circuits to identify components in the signals corresponding to respective frequencies characteristic of the repeating pattern on the first track and the repeating pattern on the second track, and computation circuitry to determine from the components a ratio by which the read head is off-track. Corresponding methods are provided for operating such a storage device and for reading data.

22 Claims, 5 Drawing Sheets

(56) References Cited

U.S. PATENT DOCUMENTS

| | | |
|---|---|---|
| 8,339,722 B1 | 12/2012 | Wu et al. |
| 9,361,939 B1 | 6/2016 | Eaton |
| 2011/0149432 A1 | 6/2011 | Coker et al. |

\* cited by examiner

METHOD AND APPARATUS FOR DETERMINING READ-HEAD DEVIATION USING ORTHOGONAL PREAMBLES

CROSS REFERENCE TO RELATED APPLICATION

This is a continuation of commonly-assigned U.S. patent application Ser. No. 15/215,052, filed Jul. 20, 2016 (now U.S. Pat. No. 9,875,762), which is a continuation of, and commonly-assigned U.S. patent application Ser. No. 14/797,393, filed Jul. 13, 2015 (now U.S. Pat. No. 9,424,880), which claims the benefit of, and commonly-assigned U.S. Provisional Patent Application No. 62/024,251, filed Jul. 14, 2014, each of which is hereby incorporated by reference herein in its respective entirety.

FIELD OF USE

This disclosure relates to data storage systems of the type in which read and write heads move over the surface of a storage medium. More particularly, this disclosure relates to determining the degree of off-track deviation of a read head, to improve read performance.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial and angular position of the head and can feed back that determination to control the position of the read head or the write head, depending on the required operation. Among the servo data are sync marks, which are used to determine angular position. Separate instances of the sync mark are provided at different radial positions—i.e., for different tracks.

Data on adjacent tracks are generally independent of one another. However, as areal densities for magnetic data storage continue to increase, data tracks are being written in an overlapping or "shingled" fashion—e.g., in "two-dimensional magnetic recording" (TDMR)—and reading is performed using read heads or sensors having dimensions comparable to the track width. Therefore, it is important to know whether, and by how much, a read head is deviating from its nominal position relative to a track.

SUMMARY

A method according to this disclosure, for operating a storage device having a storage medium, includes writing data to tracks on the storage medium, where data for each track including a preamble including a repeating pattern, and wherein the repeating pattern in any first track is orthogonal to the repeating pattern in any track adjacent to the first track. The method further includes detecting with a read head signals from both the first track and an adjacent track, and analyzing preamble output of the read head to determine a ratio by which the read head is off-track.

In a further implementation of that method, the analyzing includes applying a Discrete Fourier Transform to the preamble output of the read head.

According to another implementation, a method of reading data from a storage device having a storage medium to which data are written in tracks, where data on each track includes a preamble including a repeating pattern, and where the repeating pattern in any first track is orthogonal to the repeating pattern in any track adjacent to the first track, includes detecting the first track with a read head subject to off-track excursions during which the read head detects signals from both the first track and an adjacent track, and analyzing preamble output of the read head to determine a ratio by which the read head is off-track.

According to a further implementation of that method, the analyzing includes applying a Discrete Fourier Transform to the preamble output of the read head.

An implementation of a storage device according to this disclosure includes read circuitry having a read head having a detector that outputs signals representing data from a first track and an adjacent track, where the read head is subject to off-track excursions during which the read head detects signals from both the first track and an adjacent track, and where data on each track including a preamble including a repeating pattern, with the repeating pattern in any first track being orthogonal to the repeating pattern in any track adjacent to the first track. The read circuitry also includes respective Discrete Fourier Transform circuits to identify components in the signals corresponding to respective frequencies characteristic of the repeating pattern on the first track and the repeating pattern on the second track, and computation circuitry to determine from the components a ratio by which the read head is off-track.

According to a further implementation of that storage device, the detector outputs analog signals, and the read circuitry further includes analog-to-digital converter circuitry that outputs samples of the analog signals for input to the respective Discrete Fourier Transform circuits.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
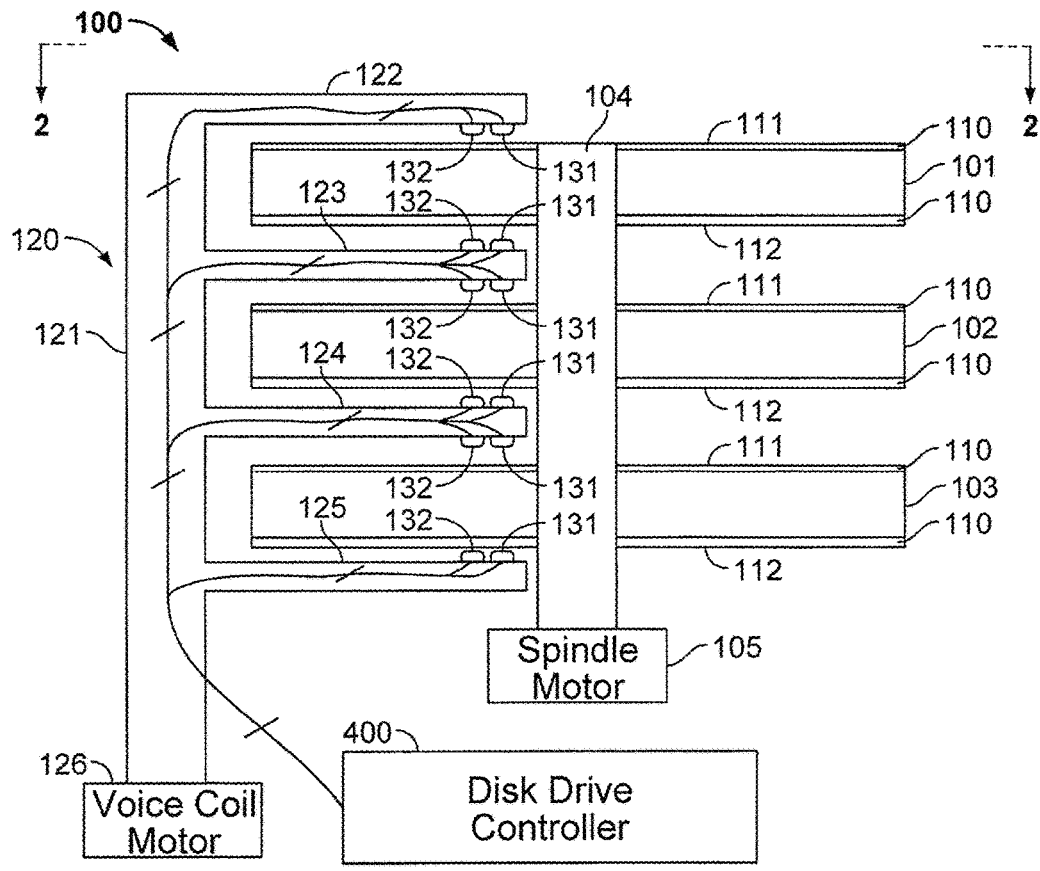
FIG. 1 is a side elevational view of a portion of a disk drive with which the present disclosure may be used.
Figure 2:
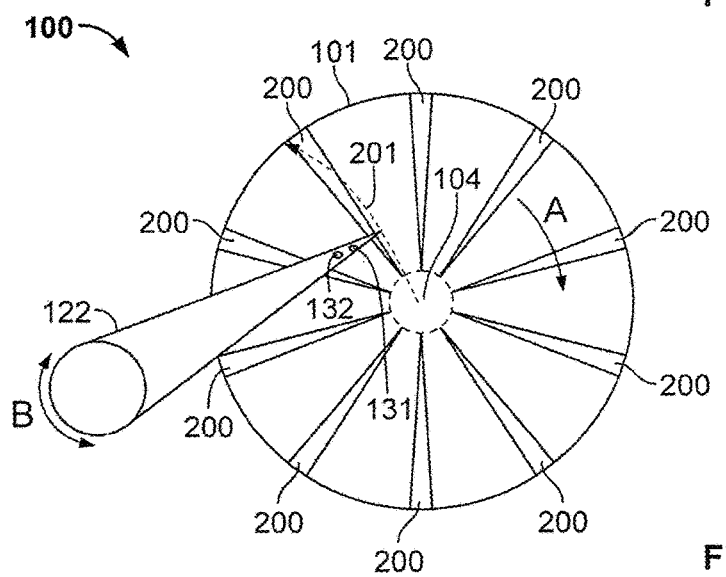
FIG. 2 is a plan view of the disk drive portion of FIG. 1, taken from line 2-2 of FIG. 1.

FIGS. 1 and 2 show an example of a disk drive 100 with which the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and will be used to represent read sensors, although it would normally at least be expected that each set of one or more read sensors has a companion write head (not shown). It should be noted that FIGS. 1 and 2 are schematic only and not to scale. For example, the spindle diameter may be larger by comparison to the disk diameter.

A motor 126, commonly referred to as a "voice-coil motor," rotates actuator 121 back and forth along the directions of arrow B (FIG. 2) to move the heads 131, 132 along the path indicated by dashed arrow 201, although arms 122-125 normally cannot point directly at the center of the disk. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge, or sector, number (to give an angular, tangential or circumferential position) and by data representing, at each point along a radius of the platter, the distance from spindle 104, although sometimes some of this information is omitted from some of the wedges.

As noted above, as areal densities for magnetic data storage continue to increase, data tracks are being written in an overlapping or "shingled" fashion—e.g., in "two-dimensional magnetic recording" (TDMR)—and reading is being performed using read heads or sensors having dimensions comparable to the track width. Therefore, it is important to know whether, and by how much, a read head is deviating from its nominal position relative to a track. If an off-track condition is detected, system parameters can be optimized for better performance based on the amount by which the heads are off-track. For example, filter parameters, as well as the amount of gain for each head, can be adjusted based on the amount by which the heads are off-track.

In accordance with implementations of this disclosure, adjacent tracks may be written with orthogonal preambles—i.e., preambles that are mutually exclusive, as described in copending, commonly-assigned U.S. patent application Ser. No. 14/563,578, filed Dec. 8, 2014, which is hereby incorporated by reference herein in its entirety. Specifically, the preambles may be chosen to be a pair of periodic patterns such that the inner product of the two patterns in question, when represented as sequences of write current polarities $\{-1,1\}$, over a window chosen to contain an integer number of periods of both patterns, is zero. For example, a 2T pattern (110011001100 . . . ) may be written to the preambles on each even-numbered track, while a 3T pattern (111000111000111000 . . . ) may be written to the preambles on each odd-numbered track, although any pair of periods where one period is not a multiple of the other may be selected. There may be other patterns as well, such as a 4T pattern (1111000011110000111110000 . . . ). Any pair of such orthogonal patterns may be used for adjacent tracks in accordance with this disclosure. These patterns may be described in terms of tones (i.e., sinusoidal signals at the fundamental frequencies of the respective patterns).

Figure 3:
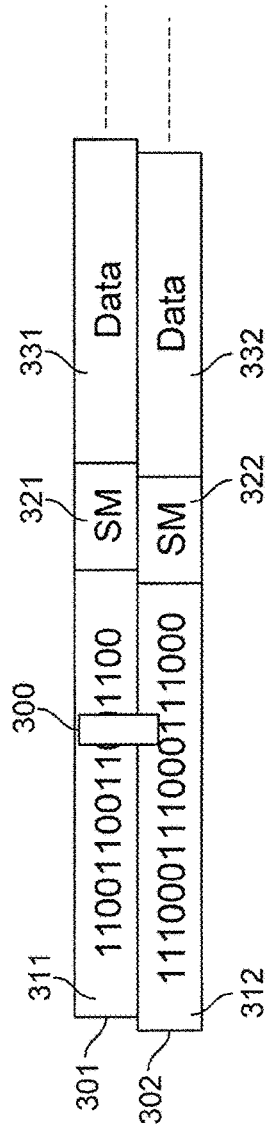
FIG. 3 is a schematic representation of an example of adjacent data tracks with an off-track read head.

A pair of tracks 301, 302 with orthogonal preambles 311, 312 as described above is shown in FIG. 3. Although tracks 301, 302 are shown are shown as being straight, in the case of a rotating medium such as a disk drive platter, tracks 301, 302 actually would be curved. FIG. 3 also shows a read head 300 which is in an off-track condition; although read head 300 nominally should be aligned with track 301, read head 300 as shown is mainly over track 301, but is partially over track 302 as well. The portions of tracks 301, 302 that are shown would be outside the servo wedges 200—i.e., preambles 311, 312 are interspersed among the user data outside the servo wedges 200 (e.g., at the beginnings of at least some data packets). Normally, each preamble is followed by one of sync marks 321, 322. However, in some cases, extra preambles may be inserted without sync marks.

Figure 4:
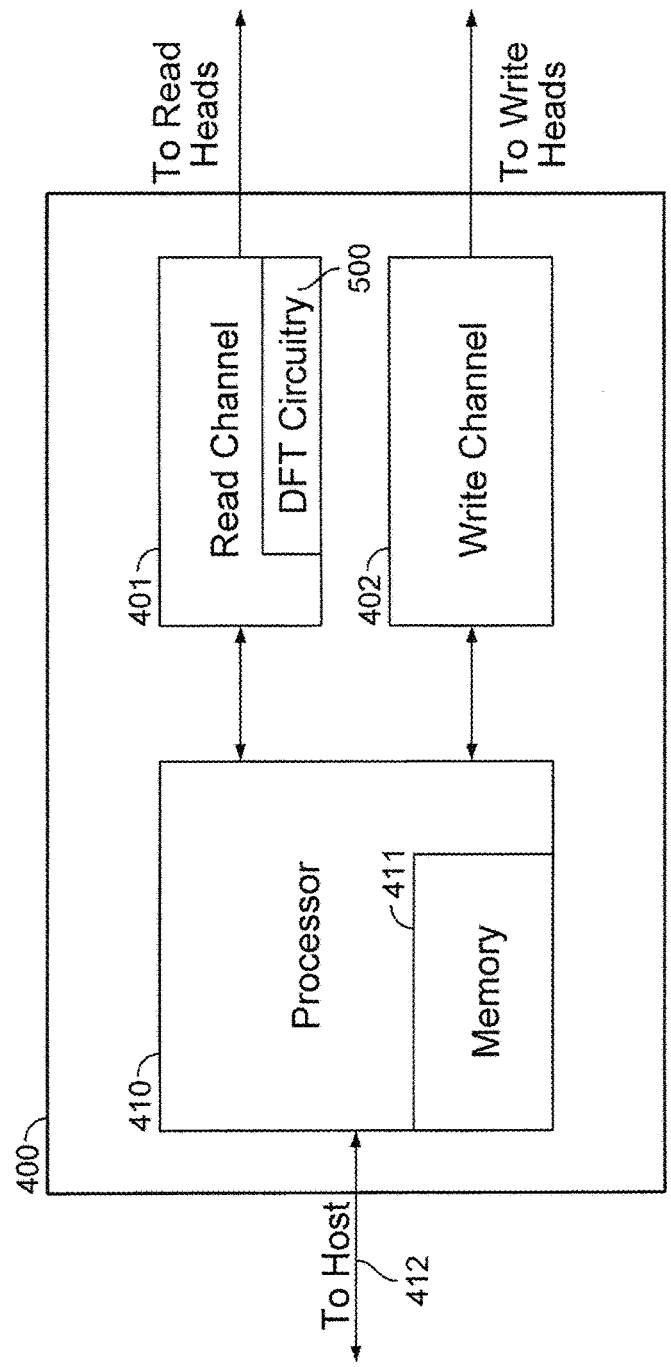
FIG. 4 is a schematic representation of a controller for the drive of FIGS. 1 and 2.

Read head 300 is connected to a read channel 401 of a hard drive controller 400 (FIG. 4). In addition, an unseen write head is connected to a write channel 402 of hard drive controller 400. Hard drive controller 400 also includes a processor 410 and memory 411, as well as a connection 412 to a host processor (not shown). Memory 411 may be used to store the position error signal (PES) data that indicates the track position offsets. A servo control loop in hard drive controller 400 uses the PES data to keep read head 300 (as well as the unseen write head) on track.

Figure 5:
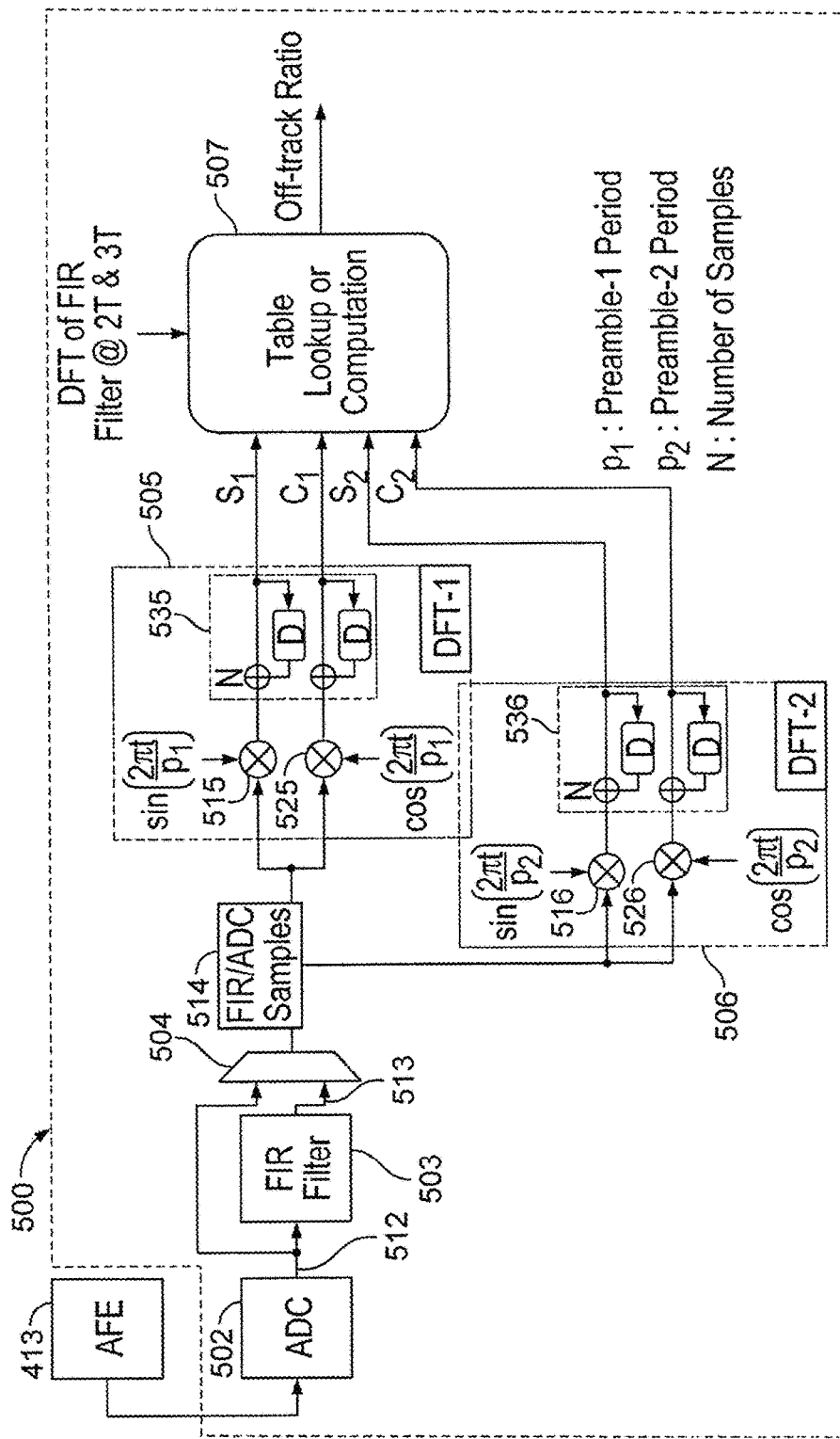
FIG. 5 is a schematic representation of off-track detection circuitry that may be used in apparatus according to this disclosure.

In accordance with an implementation of this disclosure, read channel 401 of hard drive controller 400 also includes Discrete Fourier Transform (DFT) circuitry 500, shown in more detail in FIG. 5, to determine the amount by which read head 300 is off-track. Read channel 401 will include, as is well known, an analog front end (AFE) 413 that will output mainly sinusoidal signals. In an example where the orthogonal preambles 311, 312 of the two tracks 301, 302 include, respectively, a 2T tone and a 3T tone, the sinusoidal signal derived by AFE 413 from the 2T tone will have a period of 4T (1100), while the sinusoidal signal derived from the 3T tone will have a period of 6T (111000). If other tones are used, they will have corresponding periods.

The two sinusoidal signals from AFE 413 are input to analog-to-digital converter (ADC) 502 to provide digitized ADC samples 512. Digitized ADC samples 512 are then filtered by finite-impulse-response (FIR) filter 503 to provided FIR samples 513. A multiplexer 504 selects either digitized ADC samples 512, or FIR samples 513.

First, as described above, the tones correspond to sinusoidal signals at frequencies determined by the respective patterns. For some tones (e.g., 3T and 4T), the DFT process may reveal a fundamental tone and additional harmonics. Once the harmonics are identified, the portion of each signal attributable to the fundamental frequency of each tone can be determined.

Multiplexer output samples 514 are input to Discrete Fourier Transform circuit 505 operating at the first (e.g., 2T) frequency and to Discrete Fourier Transform circuit 506 operating at the second (e.g., 3T) frequency. In Discrete Fourier Transform (DFT) circuits 505, 506, $p_1$ is the period of the first frequency, $p_2$ is the period of the second frequency, and N is the number of samples to be accumulated. Each DFT circuit has a multiplier 515 or 516 that convolves each of N samples with $\sin(2\pi t/p_1)$ or $\sin(2\pi t/p_2)$, respectively, and a multiplier 525 or 526 that convolves each of the N samples with $\cos(2\pi t/p_1)$ or $\cos(2\pi t/p_2)$, respectively. Respective accumulators 535, 536 accumulate the multiplication results over all samples.

Discrete Fourier Transform circuit 505 outputs signals $s_1$ and $c_1$, representing the sine and cosine of the contribution of the first tone to the output of read head 300, while Discrete Fourier Transform circuit 506 outputs signals $s_2$ and $c_2$, representing the sine and cosine of the contribution of the second tone to the output of read head 300. These signals $s_1$, $c_1$, $s_2$, $c_2$ can be used in computation block 507 (discussed below) to determine a ratio representing how much of read head 300 is over track 301 and how much of read head 300 is over track 302.

Figure 6:
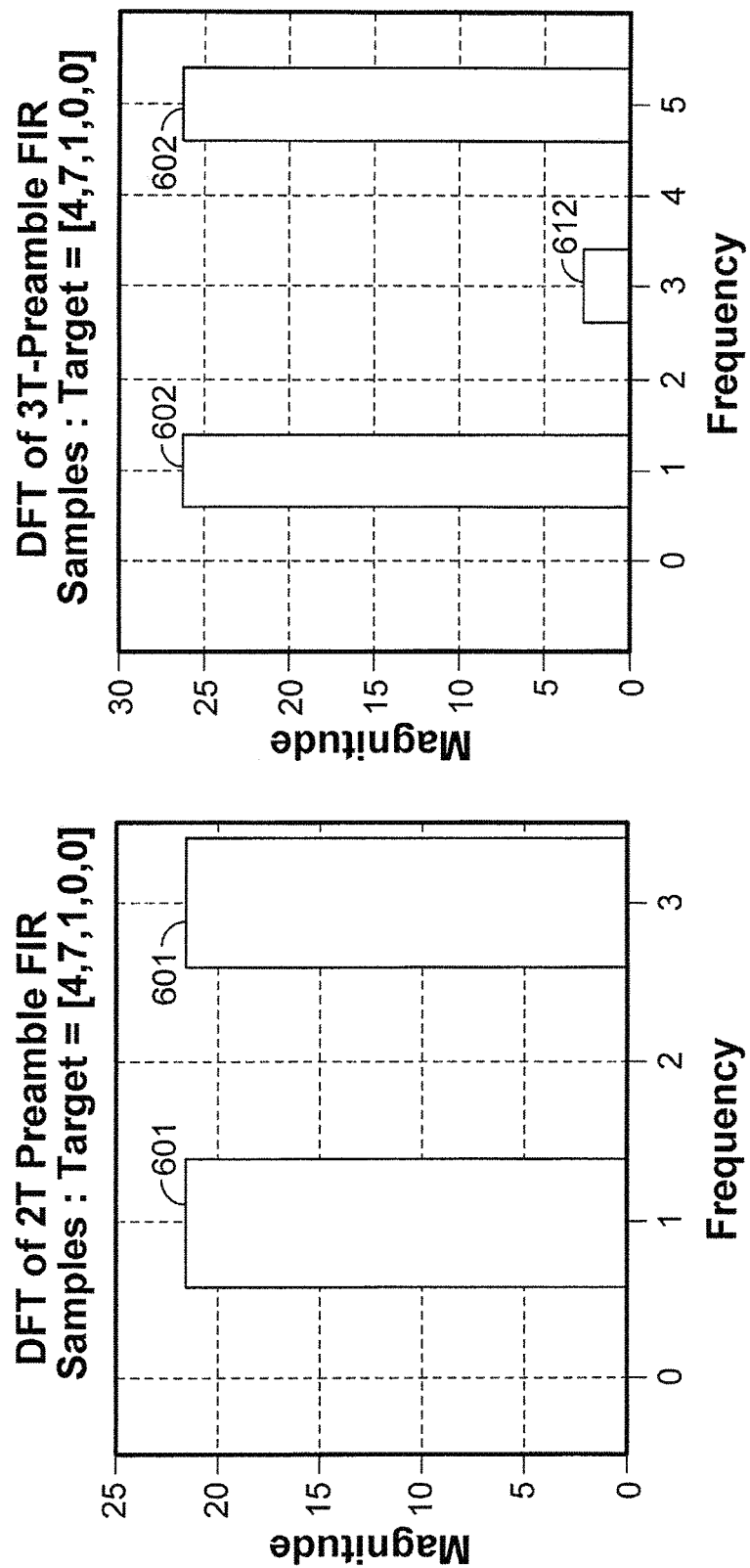
FIG. 6 is a graph of Discrete Fourier Transform results in an implementation of a method according to this disclosure.

FIG. 6 shows the DFT results for 2T and 3T tones for an example in which the FIR filter equalizes the channel to the target response of [4,7,1,0,0]. As can be seen, each of the 2T tones 601 (all tones are fundamental) has a magnitude $A_{2T}=21.540659228538015$. The 3T tone has both fundamental (602) and harmonic (612) components; the fundamental component 602 of the 3T tone has a magnitude $A_{3T}=26.263620804789610$.

Returning to FIG. 5, block 507 can compute the magnitudes of the contributions to the samples 514 by the fundamental components of each of the 2T (all components are fundamental) and 3T tones, which may be represented as $m_{2T}$ and $m_{3T}$. For an N-point DFT:

$$m_{2T} = \frac{2}{N} \cdot \sqrt{s_1^2 + c_1^2}$$

$$m_{3T} = \frac{2}{N} \cdot \sqrt{s_2^2 + c_2^2}$$

The desired off-track ratio r may then be computed as follows:

$$r=(m_{2T}/A_{2T})/(m_{3T}/A_{2T})$$

The DFT computations in block 507 can be performed by suitable arithmetic circuits (e.g., arithmetic logic units (ALUs)) that perform the arithmetic and trigonometric functions needed. Alternatively, however, block 507 could be implemented as one or more look-up tables with pre-computed results, where the values of $s_1$, $c_1$, $s_2$, $c_2$ are used as addresses into the look-up table to extract the correct results.

As one example, a look-up table implementation can be configured as a two-stage operation. In a first stage, $m_{2T}$ and $m_{3T}$ can be derived from a look-up table using $s_1$, $c_1$, $s_2$, $c_2$ as inputs. Because the expressions for $m_{2T}$ and $m_{3T}$ are the same (see above), this stage can be further streamlined by using the same look-up table for both the $m_{2T}$ calculation and the $m_{3T}$ calculation. This can be done either with a dual-port look-up table, or by time-division multiplexing a single-port look-up table, although the latter option would be slower. Or two separate look-up tables can be used, one of which determines $m_{2T}$ from $s_1$, $c_1$, and the other of which determines $m_{3T}$ from $s_2$, $c_2$. Either way, the second stage can use the $m_{2T}$ and $m_{3T}$ results as addresses into another look-up table that provides the value of the ratio r. Alternatively, a single look-up table can be used to derive r directly from $s_1$, $c_1$, $s_2$, $c_2$, but because different combinations of $s_1$, $c_1$, $s_2$, $c_2$ may yield the same value of r, such an alternative may be less efficient because it may require a larger look-up table.

Once the ratio r has been computed based on reading signals from preambles 311, 312, then as is well-known, r can be used when reading user data to determine how much of the read signals are attributable to each of data payloads 331, 332, and thereby to determine those data payloads 331, 332.

Figure 7:
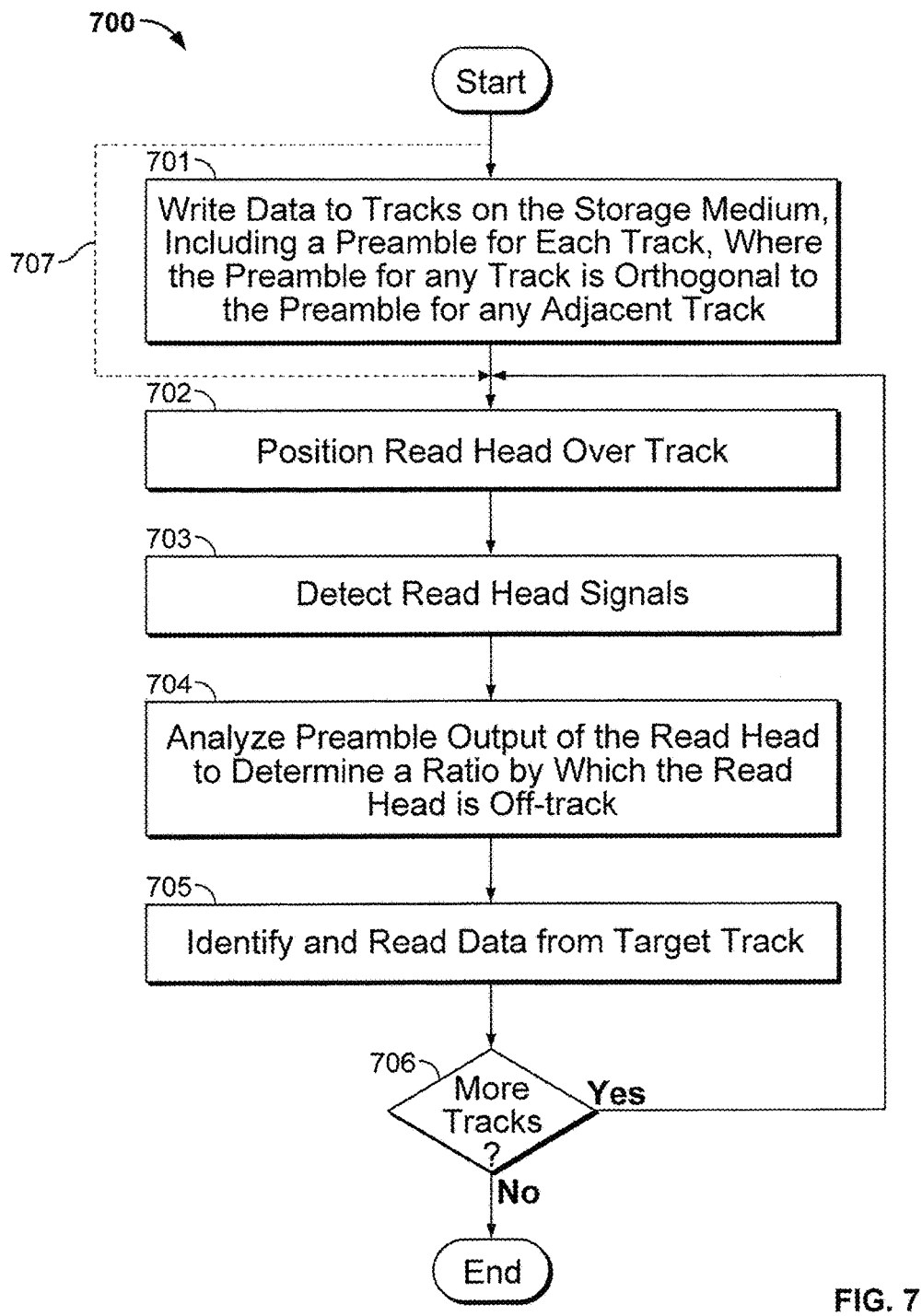
FIG. 7 is a flow diagram of an implementation of an alternate method according to this disclosure.

A method 700 of operating a storage device according to this disclosure is diagrammed in FIG. 7. In a method including writing data, at 701, data are written to tracks on the storage medium, including a preamble for each track, where the preamble for any track is orthogonal to the preamble for any adjacent track. At 702, the read head is positioned over a target track to be read. At 703, read head signals are detected. As noted above, the read head signals are likely to contain contributions from both the target track and an adjacent track. At 704, preamble output of the read head is analyzed, as described above, to determine a ratio by which the read head is off-track. At 705, the ratio is used to identify and read data from target track. At 706, it is determined whether there are any additional tracks to be read. If there are additional tracks to be read, method 700 returns to 702 to read those tracks. If at 706 there are no additional tracks to be read, method 700 ends. Note that a method of reading tracks that have previously been written would begin at 702 rather than at 701, as indicated by dashed line 707.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a storage device having a storage medium, the method comprising:
writing user data in a shingled manner to two adjacent tracks on the storage medium, including writing patterns on each track so that the pattern on a first one of the two adjacent tracks and the pattern on a second one of the two adjacent tracks are mutually exclusive;
detecting, with a first read head in a first position during a pass, signals from the two adjacent tracks;
detecting, with a second read head in a second position during the pass, signals from the two adjacent tracks;
analyzing outputs of the first read head and the second read head to derive, from the signals from the two adjacent tracks detected by the first read head during the pass, and from the signals from the two adjacent tracks detected by the second read head during the pass, the user data that was written to the two adjacent tracks.

2. The method of claim 1 wherein the patterns are written outside servo wedges of the storage medium.

3. The method of claim 1 wherein the analyzing comprises applying a Discrete Fourier Transform to the outputs of the first read head and the second read head.

4. The method of claim 3 further comprising filtering the outputs of the first read head and the second read head prior to the applying a Discrete Fourier Transform to the outputs of the first read head and the second read head.

5. The method of claim 3 wherein:
there is a first frequency corresponding to the pattern on the first one of the two adjacent tracks and a second frequency corresponding to the pattern on the second one of the two adjacent tracks; and
the applying a Discrete Fourier Transform to the output of the read head comprises applying separate Discrete Fourier Transforms for the first frequency corresponding to the pattern on the first one of the two adjacent tracks and the second frequency corresponding to the pattern on the second one of the two adjacent tracks.

6. The method of claim 5 wherein the analyzing comprises deriving a detected magnitude and a fundamental frequency magnitude for each frequency from outputs of the separate Discrete Fourier Transforms.

7. The method of claim 6 further comprising:
identifying, prior to the deriving, fundamental and harmonic components of the outputs of the Discrete Fourier Transforms; and
performing the deriving on only the fundamental components.

8. A method of reading data from a storage device having a storage medium to which user data are written in tracks in a shingled manner, with data on each track including a pattern, wherein the pattern on a first one of two adjacent tracks and the pattern on a second one of the two adjacent tracks are mutually exclusive, the method comprising:
detecting, with a first read head in a first position during a pass, signals from the two adjacent tracks;
detecting, with a second read head in a second position during the pass, signals from the two adjacent tracks;
analyzing outputs of the first read head and the second read head to derive, from the signals from the two adjacent tracks detected by the first read head during the pass, and from the signals from the two adjacent tracks detected by the second read head, the user data that were written to the two adjacent tracks.

9. The method of claim 8 wherein the analyzing comprises analyzing only patterns written outside servo wedges of the storage medium.

10. The method of claim 8 wherein the analyzing comprises applying a Discrete Fourier Transform to the outputs of the first read head and the second read head.

11. The method of claim 10 further comprising filtering the outputs of the first read head and the second read head prior to the applying a Discrete Fourier Transform to the outputs of the first read head and the second read head.

12. The method of claim 11 wherein the applying a Discrete Fourier Transform to the outputs of the first read head and the second read head comprises applying separate Discrete Fourier Transforms for a first frequency corresponding to the pattern on the first one of the two adjacent tracks and a second frequency corresponding to the pattern on the second one of the two adjacent tracks.

13. The method of claim 12 wherein the analyzing comprises deriving a detected magnitude and a fundamental frequency magnitude for each frequency from outputs of the Discrete Fourier Transforms.

14. The method of claim 13 further comprising:
identifying, prior to the deriving, fundamental and harmonic components of the outputs of the Discrete Fourier Transforms; and
performing the deriving on only the fundamental components.

15. A storage device comprising:
read circuitry including:
a first read head and a second read head, the first read head having a first detector that outputs a first signal representing data detected, during a pass, from a first one of two adjacent tracks that are written in a shingled manner, and a second one of the two adjacent tracks, and a second detector that outputs a second signal representing data detected, during the pass, from the first one of the two adjacent tracks, and the second one of the two adjacent tracks, data on each track including a pattern outside servo wedges of the storage device, wherein the pattern on the first one of the two adjacent tracks, and the pattern on the second one of the two adjacent tracks, are mutually exclusive;
respective Discrete Fourier Transform circuits to identify components in the signals, derived from the patterns in the user data outside the servo wedges of the storage device, corresponding to respective frequencies characteristic of the pattern on the first one of the two adjacent tracks, and the pattern on the second one of the two adjacent tracks; and
computation circuitry to determine from the components, derived during the pass, the user data that were written to the first one of the two adjacent tracks, and the second one of the two adjacent tracks.

16. The storage device of claim 15 wherein:
the detector outputs analog signals; and
the read circuitry further comprises analog-to-digital converter circuitry that outputs samples of the analog signals for input to the respective Discrete Fourier Transform circuits.

17. The storage device of claim 16 further comprising filter circuitry between the analog-to-digital converter circuitry and the respective Discrete Fourier Transform circuits.

18. The storage device of claim 17 wherein the filter circuitry comprises a finite impulse response filter.

19. The storage device of claim 16 wherein the computation circuitry derives a detected magnitude and a fundamental frequency magnitude for each frequency from outputs of the Discrete Fourier Transform circuits.

20. The storage device of claim 19 wherein:
the computation circuitry comprises a look-up table; and
the outputs of the Discrete Fourier Transform circuits are addresses into the look-up table.

21. The storage device of claim 20 further comprising filter circuitry on outputs of the analog-to-digital converter circuitry; wherein:
the computation circuitry operates also on output from the filter circuitry.

22. The storage device of claim 21 wherein the filter circuitry comprises finite impulse response filter circuitry.

* * * * *